United States Patent
Hagemeyer et al.

(10) Patent No.: US 6,372,687 B1
(45) Date of Patent: Apr. 16, 2002

(54) SUPPORTED CATALYSTS HAVING A HIGH SINTERING STABILITY AND A PROCESS FOR PRODUCING THEM

(75) Inventors: Alfred Hagemeyer, Rheine; Harald Werner, Bad Homburg; Uwe Dingerdissen, Seeheim-Jugenheim; Klaus Kühlein, Kelkheim, all of (DE); John Meurig Thomas, Cambridge (GB); Brian F. G. Johnson, Cambridge (GB); D. S. Shephard, Cambridge (GB); T. Maschmeyer, Den Hang (NL)

(73) Assignee: Hoechst Research & Technology, Frankfurt (DE)

( * ) Notice: Subject to any disclaimer, the term of this patent is extended or adjusted under 35 U.S.C. 154(b) by 0 days.

(21) Appl. No.: 09/173,123

(22) Filed: Oct. 15, 1998

(30) Foreign Application Priority Data

Oct. 17, 1997 (DE) .......................... 197 45 905

(51) Int. Cl.$^7$ ........................... B01J 23/40; B01J 23/56; B01J 21/08
(52) U.S. Cl. ...................... 502/326; 502/327; 502/332; 502/261
(58) Field of Search ............................... 502/324, 326, 502/330, 416, 174, 179, 102, 152, 261, 327, 332; 208/111

(56) References Cited

U.S. PATENT DOCUMENTS

| | | | | |
|---|---|---|---|---|
| 4,217,249 A | * | 8/1980 | McVicker | 252/466 PT |
| 4,752,600 A | * | 6/1988 | Fiato et al. | 502/325 |
| 4,831,008 A | * | 5/1989 | Timmer et al. | 502/328 |
| 4,895,976 A | | 1/1990 | Burke et al. | |
| 5,026,673 A | * | 6/1991 | Gates et al. | 502/62 |
| 5,145,816 A | * | 9/1992 | Beck et al. | 502/60 |
| 5,334,368 A | * | 8/1994 | Beck et al. | 423/704 |
| 5,348,687 A | * | 9/1994 | Beck et al. | 252/582 |
| 5,370,785 A | * | 12/1994 | Beck et al. | 208/46 |
| 5,560,748 A | * | 10/1996 | Surutzidis et al. | 8/111 |
| 5,786,294 A | * | 7/1998 | Sachtler et al. | 502/349 |
| 5,840,271 A | * | 11/1998 | Carrazza et al. | 423/700 |
| 5,869,417 A | * | 2/1999 | Woo et al. | 502/107 |
| 5,958,367 A | * | 9/1999 | Ying et al. | 423/701 |
| 5,958,368 A | * | 9/1999 | Ryoo et al. | 423/705 |

FOREIGN PATENT DOCUMENTS

| | | |
|---|---|---|
| WO | WO 96/19289 | 6/1996 |
| WO | WO 98/42441 | 10/1998 |

OTHER PUBLICATIONS

Chemical Abstracts, vol. 124, No. 26, Jun. 24, 1996, Abstract No. 353670.
J. Am. Chem. Abstracts, vol. 118, No. 24, 1996, p. 1511.

* cited by examiner

*Primary Examiner*—Steven P. Griffin
*Assistant Examiner*—Cam N. Nguyen
(74) *Attorney, Agent, or Firm*—Frommer Lawrence & Haug LLP

(57) ABSTRACT

Supported catalysts having a high sintering stability and comprising one or more noble metal cluster carbonyl compounds of the formula (1)

$$[H_a M_b N_c L_d (CO)_x]^{n-} A^{n+}$$

and their use for the dehydrogenation, hydrogenation and oxidation of organic compounds where

| | |
|---|---|
| M and N | are, independently of one another, one or more metals selected from the group consisting of Pt, Rh, Ir, Os, Ru, Ag, Pd, Au, Ni, Fe, Co, Cu, Re, Mn; |
| L | is one or more neutral or anionic ligands which may be identical or different; |
| $(A)^{n+}$ | is one or more cations which balance the charge of the complex; |
| a | is an integer from 0 to 10, preferably from 0 to 6; |
| b | is an integer from 2 to 60; |
| c | is an integer from 0 to 30; |
| d | is an integer from 0 to 60; |
| x | is an integer from 1 to 120; |
| n | is the total charge of the complex which results from the individual charges of the constituents and is greater than 0, | wherein the compounds of the formula (1) are located in the pores of a mesoporous support material.

23 Claims, No Drawings

SUPPORTED CATALYSTS HAVING A HIGH SINTERING STABILITY AND A PROCESS FOR PRODUCING THEM

CROSS REFERENCE TO RELATED APPLICATIONS

This invention claims priority to German application Ser. No. 19745905.6, filed Oct. 17, 1997.

STATEMENT REGARDING FEDERALLY SPONSORED RESEARCH AND DEVELOPMENT

Not applicable.

BACKGROUND OF THE INVENTION

1. Field of the Invention

The present invention relates to supported catalysts based on noble metal carbonyl compounds, a process for producing these catalysts and their use for the hydrogenation, dehydrogenation or oxidation of organic compounds or peroxide decomposition.

2. Description of the Related Art

There has been considerable interest in the formation, structure and catalytic use of monometallic and bimetallic nanosize particles and clusters since the excellent catalytic properties of Ru—Cu, Pt—Ir and Pt—Re systems supported on aluminum oxide in reforming processes were shown in "Bimetallic Catalysts", Wiley, N.Y., 1983 and Int. Rev. Phys. Chem. 7, 1988,281.

Apart from the conventional ceramic catalyst supports having a broad pore radius distribution, e.g. $SiO_2$, $Al_2O_3$, $TiO_2$ and $ZrO_2$, increasing use has also been made, owing to their ready accessibility via hydrothermal synthesis, of purely mesoporous materials having pore diameters in the range from 2.5 to 10 nm as supports, as described, for example, in Current Opinion in Solid State and Material Science, 1, 1996, 76 and Current Opinion in Colloid Science, 1, 1996, 523.

Processes are also known for locating catalytically active centers within such mesopores. Nature, 378, 1995, 159, Angew. Chem. Int. Ed. Engl. 35, 1996, 2787 and Faraday Discuss. 105, 1996, 1 disclose such processes, for example the anchoring of Ti(IV) ions via Si—O bonds.

Numerous methods have been disclosed for applying noble metals and noble metal clusters to inert ceramic supports, likewise to the abovementioned mesoporous supports, in order to produce supported catalysts for hydrogenations and oxidations. Reviews may be found, for example, in Clusters and Colloids, VCH, Weinheim, 1994; Heterogeneous Catalysis, Clarendon Press, Oxford, 1987; Catalytic Chemistry, Wiley, N.Y., 1992, and Metal Clusters in Catalysis, Elsevier, Amsterdam, 1986. Although the catalysts obtained by the processes of the prior art are active in the initial phase of their use, they rapidly deactivate since the fixing of the nanosize noble metal particles and noble metal clusters to the support is unsatisfactory and the primary particles agglomerate as a result of sintering phenomena to form larger particles having only a low catalytic surface area.

OBJECT OF THE INVENTION

It is therefore an object of the present invention to provide a catalyst which still has a high activity after prolonged operating times and which has a good sintering stability, i.e. in which the noble metal clusters or nanosize particles do not agglomerate to form larger particles even after sintering. A further object of the invention is to provide a process for applying and fixing noble metal clusters to supports bearing hydroxyl groups, resulting in supported catalysts in which the metal is finely distanced and which have high activity and excellent sintering stability.

SUMMARY OF THE INVENTION

The present invention achieves this object by providing novel supported catalysts which have high catalytic activity and selectivity and also excellent sintering stability and do not have the disadvantages of the known catalysts, a process for producing these catalysts and their use in organic reactions.

BRIEF DESCRIPTION OF THE DRAWINGS

Not applicable.

DETAILED DESCRIPTION OF THE INVENTION

The present invention accordingly provides supported catalysts having a high sintering stability and comprising one or more noble metal cluster carbonyl compounds of the formula (1)

$$[H_aM_bN_cL_d(CO)_x]^{n-}A^{n+}$$

where

| | |
|---|---|
| M and N | are, independently of one another, one or more metals selected from the group consisting of Pt, Rh, Ir, Os, Ru, Ag, Pd, Au, Ni, Fe, Co, Cu, Re, Mn; |
| L | is one or more neutral or anionic ligands which may be identical or different; |
| $(A)^{n+}$ | is one or more cations which balance the charge of the complex; |
| a | is an integer from 0 to 10, |
| b | is an integer from 2 to 60; |
| c | is an integer from 0 to 30; |
| d | is an integer from 0 to 60; |
| x | is an integer from 1 to 120; |
| n | is the total charge of the complex which results from the individual charges of the constituents and is greater than 0, | wherein the compounds of the formula (1) are located in the pores of a mesoporous support material.

Suitable mesoporous support materials containing hydroxyl groups are, in particular, silicon dioxide, silicon mixed oxides, aluminum oxides, zirconium oxides or titanium oxides.

Thus, according to the invention, the pore diameter when using mesoporous silicon dioxide (e.g. MCM41®, Mobil) is, for example, in the range from 2 to 50 nm, in particular in the range from 2.5 to 30 nm.

The noble metal clusters are firmly bound to the surface hydroxyl groups of The support material so as to prevent the clusters agglomerating as a result of sintering phenomena and the catalyst becoming deactivated. According to the invention, regular arrangements of noble metal clusters are formed in the pores of the support material at high metal levels, as a result of which the active metal loading can be increased significantly without any need to fear a loss of the good metal dispersions caused by agglomeration phenomena.

Thus, in the case of ruthenium, for example, the spacing of the regularly arranged noble metal cluster carbonyl compounds along the mesopore axis of the support material is, when using MCM-41, in the range from 1.0 to 5.0 nm, in particular in the range from 1.7 to 2.7. When using other support materials, the spacing of the clusters can be in the range from 0.5 to 5 nm.

The support can be impregnated with the impregnation solution by means customary in the prior art, for example by impregnation, dipping, spraying or ultrasonic dispersion. The monometal or bimetal noble metal carbonyl complexes are adsorbed from solution onto the support material. Suitable solvents are those which do not react with the noble metal carbonyl complexes. Examples of such inert solvents are aliphatic ethers, in particular diethyl ether.

In a preferred embodiment, loading of the support with the anionic clusters is achieved by the two components being slurried in ether and a small amount of a second solvent, e.g. methylene chloride, in which the cluster salt is soluble.

The noble metal M is preferably Ru, Ag, Pd, Pt, Au, Rh, Re, Ir, Co, Cu or Ni. The stoichiometric index b is in the range from 2 to 60, in particular in the range from 3 to 30.

The noble metal N is preferably Ag or Cu. The stoichiometric index c is preferably in the range from 0 to 30, in particular in the range from 0 to 15.

Apart from the noble metals and the CO groups, the noble metal carbonyl complexes may further comprise hydrogen or other ligands, but it is also possible for them to be pure carbonyl complexes without other ligands. The noble metal carbonyl complexes can comprise one, 2, 3 or 4 different chemical species as anionic, in particular strongly reducing, ligands L. These chemical species can be, for example, C, N, S, $C_2$, F, Cl, Br, I, $BF_4$, cyanide, isocyanide, cyanate, isocyanate, CNO, phosphines, phosphine oxides, arsines, amines, saturated or unsaturated alkyl, allyl or aryl radicals, e.g. cyclopentadienyl, which can occur in neutral form or as anions.

If the noble metal carbonyl complexes comprise one chemical species as ligand, the stoichiometric coefficient d indicates the number present. If the noble metal carbonyl complexes comprise more than one chemical species as ligands, d indicates the number present of each of them and can also be different for the individual types of ligands. For each chemical species, d is from 0 to 60, in particular from 0 to 30.

The number x of CO groups present in the complex is in the range from 1 to 120, preferably in the range from 1 to 60, in particular in the range from 5 to 50.

The total charge n of the complexes depends on the sum of the charges borne by the metals and ligands; it is preferably in the range from −1 to −10, in particular in the range from −1 to −6.

Compounds of the formula 1 which are preferred according to the invention are, for example:

$(Rh_{13}(CO)_{24}H_3)^{2-}$, $(Rh_{12}(CO)_{30})^{2-}$, $(Rh_6(CO)_{15}H)^-$, $(Rh_{14}(CO)_{25})^{4-}$, $(Rh_{15}(CO)_{27})^{3-}$, $(Rh_6(CO)_{15}C)^{2-}$, $(Ni_5(CO)_{12})^{2-}$, $(Ni_6(CO)_{12})^{2-}$, $(Fe_5(CO)_{14}N)^-$, $(Co_6(CO)_{15})^{2-}$, $(HCo_6(CO)_{15})^-$, $(FeRu_3(CO)_{13})^{2-}$, $(FeRu_2Os(CO)_{13})^{2-}$, $(CoOs_3(CO)_{13})^-$, $(FeCo_3(CO)_{12})^-$, $(HOs_5(CO)_{15})^-$, $(Os_5(CO)_{15})^{2-}$, $(Os_6(CO)_{18})^{2-}$, $(Os_7(CO)_{20})^{2-}$, $(Rh_{17}(CO)_{32}(S)_2)^{3-}$, $(Pt_6(CO)_{12})^{2-}$, $(Pt_9(CO)_{18})^{2-}$, $(Pt_{12}(CO)_{24})^{2-}$, $(Pt_{15}(CO)_{30})^{2-}$, $(Pt_{18}(CO)_{36})^{2-}$, $(Ir_4(CO)_{11})^{2-}$, $(Re_6(CO)_{12}H_6)^{2-}$, $(Mn_3(CO)_{12}H_2)^-$, $(Fe_3(CO)_{11}H)^-$, $(Re_4(CO)_{16})^{2-}$, $(Os_2Re(CO)_{12})^-$, $(Os_8(CO)_{22})^{2-}$, $(Rh_6(CO)_{15}C)^{2-}$, $(Rh_{12}(CO)_{34})^{2-}$, $(RU_6C(CO)_{16})^{2-}$, $(H_2Ru_{10}C(CO)_{22})^{2-}$, $(H_2Ru_{10}(CO)_{25})^{2-}$, $(Ag_3Ru_{10}C_2(CO)_{28}Cl)^{2-}$, $(Ru_5C(CO)_{14})^{2-}$.

The formation of the structures arranged according to the invention on the surface of the support material is based firstly on the chemical fixing of the clusters and secondly on the fact that the clusters are held "at a distance" by being surrounded by bulky counterions. Thus, each cluster on the support material surface is flanked by two counterions so that two counterions are located between any two clusters.

Suitable counterions $[A]^{n+}$ which balance the charge of the noble metal carbonyl complex are one or more different ions which preferably have an ionic radius of at least 0.5 nm, in particular ≧1 nm.

Preference is given to using ions of the formula $[R_4E]^+$, where R is hydrogen, an alkyl radical having from 1 to 12 carbon atoms, an aryl radical having from 6 to 12 carbon atoms or an amine or imine group and E is N, P or As. Preference is also given to using ions of the formula $(R_2N)^+$, where N is nitrogen and R is an organic group, preferably a phosphine group such as triphenylphosphine. Particular preference is given to using tetraphenylarsonium and bis(triphenylphosphino)imminium cations. Specific examples of alkyl radicals which are used are methyl, ethyl, propyl, butyl and cyclohexyl; aryl radicals used are, in particular, phenyl rings which may be unsubstituted or substituted.

The process of the invention makes it possible to achieve a higher loading with the cluster salts on the surface of the support material. Thus, according to the invention, the loading when using MCM-41 as support material (defined as m of salt/m of MCM-41) is >0.5, in particular in the range from 0.7 to 3. The loading is calculated from the masses (m) of salt and support material when the clusters are applied to the support. The active metal loading of the finished catalyst can also be determined experimentally by atomic spectroscopy.

The catalyst is activated by converting the compounds of the formula (1) into the corresponding monometallic or bimetallic noble metals M or MN in their free form by thermal, photolytic or chemical treatment which splits off the ligand L. For this purpose, the support loaded with the noble metal clusters is subjected to a reduced pressure, preferably below 200 torr, in particular below 20 torr, especially below 200 mtorr. If necessary, the support can be heated, for instance to temperatures of from 10 to 300° C., preferably from 15 to 200° C. Heating is generally carried out for from 10 minutes to 5 hours, preferably from 20 to 180 minutes, and preferably takes place under inert gas.

The catalysts produced by the process of the invention can, before or after activation, be converted by mechanical processing such as pressing or comminution into a form which is advantageous for their use as industrial supported catalysts.

A particularly preferred embodiment of the invention is a process for producing a ruthenium catalyst prepared by impregnating a silicon dioxide support having a pore diameter of about 3 nm (®MCM 41, Mobil) with compounds containing the ruthenium cluster ions $[Ru_6C(CO)_{16}]^{2-}$ or $[H_2Ru_{10}(CO)_{25}]^{2-}$. The ruthenium complexes are preferably used in the form of a solution of their bis(triphenylphosphino]imminium salt (PPN), i.e. the counterion is $PPN^+$.

The supported catalysts of the invention have a high catalytic activity and selectivity combined with high operating lives and are particularly suitable for the hydrogenation, dehydrogenation and oxidation of organic compounds or peroxide decomposition.

EXAMPLES

Examples 1 and 2

Synthesis of the cluster precursors

The precursors $[Ru_6C(CO)_{16}][PPN]_2$ (PPN=bis(triphenylphosphino)imminium) and $[H_2Ru_{10}(CO)_{25}]$

[PPN]$_2$ were synthesized by literature methods (Johnson B. F. G., Lewis J., Sankey S., Wong W. K., McPartlin M., Nelson W. J. H., J. Organomet. Chem. 191, C3 (1980); Bailey P. J., Beswick M. A., Johnson B. F. G., Lewis J., McPartlin M., Raithby P. R., DeArellano M. C. R., J. Chem. Soc. Dalton Trans. (1996) 3515).

Adsorption On a Mesoporous MCM-41 Support 200 mg of MCM-41 were dried for 6 hours at 473 K under a high vacuum (0.01 mm of Hg). The dried support is subsequently slurried in 30 ml of dry ether with the Ru cluster salts [Ru$_6$C(CO)$_{16}$][PPN]$_2$ or [H$_2$Ru$_{10}$(CO)$_{25}$][PPN]$_2$ in the presence of 0.1 ml of CH$_2$Cl$_2$ at room temperature in the absence of light for 72 hours. The resulting red or brown solid is washed with 10 ml of ether and dried under a high vacuum (0.01 mm of Hg).

Maximum loadings for the two cluster salts were (m$_{salt}$/m$_{MCM-41}$)=8:7 and 15:9 for MCM-41/Ru$_6$ and MCM-41/Ru$_{10}$.

The products are characterized by means of IR and TEM.

IR data for MCM-41/Ru$_6$: n(CO) 2056 (w), 1968 (vs), 1929 (m.sh.), 1910 (m), 1816 (w.sh.), 1795 (w), 1727 (s) cm$^{-1}$ IR data for MCM-41/Ru$_{10}$: n(CO) 2053 (m), 2044 (w.sh.), 2007 (vs), 1989 (s.sh.), 1955 (s.sh.), 1931 (s), 1780 (w), 1751 (w), 1709 (w) cm$^{-1}$ Evaluation of the STEM photographs indicates regular arrangements of Ru clusters with (projected) spacings of 1.7 nm or 2.66 nm along the pore axis.

What is claimed is:

1. A process for producing a ruthenium supported catalyst having a high sintering stability, which comprises one or both noble metal cluster carbonyl compounds of the formula:

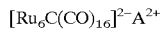

or

where A is one or more cations which balance the charge of the complex, and a mesoporous hydroxyl-containing support material, whereby the noble metal cluster carbonyl compounds are impregnated on the support material and located in the pores of the support material, said process comprises impregnating the mesoporous hydroxyl-containing support material with a solution comprising:
(i) [Ru$_6$C(CO)$_{16}$]$^{2-}$A$^{2+}$;
(ii) [H$_2$Ru$_{10}$(CO)$_{25}$]$^{2-}$A$^{2+}$; or
(iii) a combination of both [Ru$_6$C(CO)$_{16}$]$^{2-}$A$^{2+}$ and [H$_2$Ru$_{10}$(CO)$_{25}$]$^{2-}$A$^{2+}$.

2. The process according to claim 1, which further comprises activating the catalyst by:
(i) heating it at a temperature of from 10 to 300° C. at pressures below 200 torr; or
(ii) heating it at a temperature of from 10 to 300° C. under inert gas.

3. The process according to claim 1, wherein the temperature is from 15 to 200° C.

4. The process according to claim 1, wherein the mesoporous hydroxyl-containing support material is selected from the group consisting of silicon dioxide, silicon mixed oxides, aluminum oxides, zirconium oxides and titanium oxides.

5. The process according to claim 1, wherein the mesoporous hydroxyl-containing support material has a pore diameter in the range of from 2.0 to 50 nm.

6. The process according to claim 5, wherein the mesoporous hydroxyl-containing support material is silicon dioxide.

7. The process according to claim 6, wherein the silicon dioxide has a pore diameter of about 3 nm.

8. The process as claimed in claim 7, wherein the arranged noble metal cluster carbonyl compounds are spaced regularly along the mesopore axis of the silicon dioxide in the range of 1.0 to 5.0 nm.

9. The process according to claim 1, wherein the mesoporous hydroxyl-containing support material has a pore diameter in the range of from 2.5 to 30 nm.

10. The process according to claim 1, wherein A has an ionic radius of at least 0.5 nm.

11. The process according to claim 1, wherein A is a bis(triphenylphosphino)imminium cation.

12. The ruthenium supported catalyst obtained by the process according to claim 1.

13. A ruthenium supported catalyst having a high sintering stability which comprises one or both noble metal cluster carbonyl compounds of the formula:

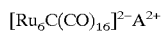

or

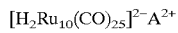

where A is one or more cations which balance the charge of the complex and a mesoporous hydroxyl-containing support material, whereby the noble metal cluster carbonyl compounds are impregnated on the support material and are located in the pores of the support material.

14. The catalyst according to claim 13, wherein the mesoporous hydroxyl-containing support material is selected from the group consisting of silicon dioxide, silicon mixed oxides, aluminum oxides, zirconium oxides and titanium oxides.

15. The catalyst according to claim 13, wherein the mesoporous hydroxyl-containing support material has a pore diameter in the range of from 2.5 to 50 nm.

16. The catalyst according to claim 13, wherein the mesoporous hydroxyl-containing support material has a pore diameter in the range of from 2.5 to 30 nm.

17. The catalyst according to claim 13, wherein the mesoporous hydroxyl-containing support material is silicon dioxide.

18. The catalyst according to claim 13, wherein the silicon dioxide has a pore diameter of about 3 nm.

19. The catalyst as claimed in claim 13, wherein the noble metal cluster carbonyl compounds are arranged so that they are spaced regularly along the mesopore axis of the silicon dioxide in the range of 1.0 to 5.0 nm.

20. The catalyst according to claim 13, wherein A has an ionic radius of at least 0.5 nm.

21. The catalyst according to claim 13, wherein A is a bis(triphenylphosphino)imminium cation.

22. The catalyst according to claim 13, wherein the catalyst is further activated by converting the noble metals in the noble metal cluster carbonyl compounds into their free form by thermal, photolytic or chemical treatment.

23. The catalyst according to claim 13, wherein the hydroxyl-containing support material is silicon dioxide and wherein the noble metal cluster carboxyl compounds are noble metal cluster salts, whereby the noble metal cluster salts are present in an amount that is greater than 0.5 mol salt per mols of silicon dioxide.

* * * * *